United States Patent [19]

Kajita et al.

[11] Patent Number: 5,272,751
[45] Date of Patent: Dec. 21, 1993

[54] PAY TELEVISION

[75] Inventors: Harumasa Kajita, Fujisawa; Satoshi Nakanami, Kamakura; Noriyuki Kawamoto, Fujisawa, all of Japan

[73] Assignee: Matsushita Electric Industrial Co., Ltd., Osaka, Japan

[21] Appl. No.: 32,164

[22] Filed: Mar. 12, 1993

Related U.S. Application Data

[63] Continuation of Ser. No. 677,129, Mar. 29, 1991, abandoned.

[30] Foreign Application Priority Data

Mar. 30, 1990 [JP] Japan .................. 2-86371

[51] Int. Cl.⁵ .......................................... H04N 7/167
[52] U.S. Cl. ........................................ 380/17; 380/21; 380/15
[58] Field of Search ................... 380/11, 15, 17, 21

[56] References Cited

U.S. PATENT DOCUMENTS

| | | | |
|---|---|---|---|
| 4,253,114 | 2/1981 | Tang et al. | 380/17 X |
| 4,323,922 | 4/1982 | den Toonder et al. | 380/20 X |
| 4,471,379 | 9/1984 | Stephens | 380/17 X |
| 4,527,195 | 7/1985 | Cheung . | |
| 4,716,588 | 12/1987 | Thompson | 380/15 X |
| 5,058,157 | 10/1991 | Ryan | 380/11 |
| 5,113,440 | 5/1992 | Harney et al. | 380/15 |
| 5,113,441 | 5/1992 | Harada | 380/15 |
| 5,142,575 | 8/1992 | Farmer et al. | 380/15 |
| 5,161,187 | 11/1992 | Kajita et al. | 380/15 |

FOREIGN PATENT DOCUMENTS 0119751 9/1984 European Pat. Off. .
2078051 12/1981 United Kingdom .

Primary Examiner—Tod R. Swann
Attorney, Agent, or Firm—Wenderoth, Lind & Ponack

[57] ABSTRACT

In a pay television device, a horizontal sync signal, a vertical sync signal, and the like are removed from a composite video signal, and first-frequency and second-frequency signals for descrambling processing are attached in the intervals corresponding to the removed signals, thus eliminating the need for multiplexing signals which are necessary for descrambling processing on an audio signal.

4 Claims, 3 Drawing Sheets

PAY TELEVISION

This application is a continuation of now abandoned application, Ser. No. 07/677,129, filed Mar. 29, 1991.

BACKGROUND OF THE INVENTION

1. Field of the Invention

The present invention relates to pay television systems, and more particularly to picture scrambling devices and picture descrambling devices employing the base-band method for use in the pay television systems.

1. Description of the Prior Art

Conventionally, various types of picture scrambling have been employed in pay television systems in order to ensure their service or to prevent their programs from being unfairly enjoyed on the side of terminal equipment. The methods of picture scrambling can roughly be classified into two types, the RF signal method and the base-band signal method. In the RF-signal method type scrambling, the amplitude of the television signal is suppressed during both the line and field flyback periods by 6 dB or 10 dB, whereas in the base-band signal method type scrambling, synchronizing signals are shifted toward the video signal and also the polarity of the video signal is inverted, for example. In addition, decoding and timing signals for a picture scrambling signal are in general amplitude-modulated and multiplexed on an audio signal that is a frequency-modulated signal, for transmission.

However, such conventional methods of picture scrambling are insufficient for concealment, because the methods can not fully prevent TV programs from being unfairly listened to and watched, or taped until it is threatening the profits of broadcasters. As another problem, since for release of the picture scrambling a decoding signal or timing signal is amplitude-modulated so as to be multiplexed on an audio signal, the amplitude-modulation component may be a hindrance to the audio signal, resulting in a deteriorated sound quality.

SUMMARY OF THE INVENTION

Accordingly, the present invention has been achieved to solve the foregoing problems, and its essential object is to provide a pay television device in which picture scrambling can be surely realized so as to prevent unfair viewing of television programs without deteriorating sound quality of the reproduced audio signal in the television system.

In accomplishing this and other objects, according to the present invention, there is provided a pay television television device which comprises:

a picture scrambling device including: sync removing means for removing sync signals of a composite video signal for producing a sync removed video signal; a signal generating means for generating a specific signal for descrambling an attaching means for attaching said specific signal in a space of said sync removed video signal from which the synchronizing signals have already been removed; a shifting means for shifting the level of said sync removed video signal and already attached by the specific signal toward the video signal side during said time space so as to produce a shifted video signal; and an inverting means for changing the polarity of the shifted video signal for producing a picture scrambled video signal; and a picture descramble device including: a detecting means for detecting said specific signal from the picture scrambled video signal output from said picture scrambling device; and a descramble means for performing descramble according to a decoding information signal derived from said specific signal.

Moreover, there is provided a pay television device which comprises:

a picture scrambling device including: a sync removing means for removing the horizontal sync signal, vertical sync signal, and equalizing pulse group from a composite video signal so as to produce a sync removed video signal; a signal generating means for generating a first specific signal having a first frequency and a second specific signal having a second frequency; a first attaching means for attaching said first-frequency signal in a first period of a descrambling timing pulse period of the sync removed video signal within the space of the horizontal sync signal and vertical sync signal of said composite video signal; a second attaching means for attaching said second-frequency signal in a second period of the descrambling timing pulse period of the sync removed video signal within the space of the horizontal sync signal and vertical sync signal of said composite video signal to produce a signal attached video signal; shifting means for a shifting the signal attached video signals during the intervals of the vertical synchronizing signal and equalizing pulse group out of the intervals of the line and field flyback periods of the composite video so as to signal thereby produce a shifted video signal; and a inverting means for changing the polarity of the shifted video signal in response to scrambling control data; to produce scrambled picture signal, and a picture descrambling device including: a timing pulse generating means for detecting said first-frequency signal from the scrambled picture signal output from said picture scrambling device to form a first timing pulse according to an internally generated frequency signal that is rendered phase-synchronized with the detected signal and for detecting said second-frequency signal out of said scrambled picture signal to form a second timing pulse; and a descrambling means for forming a descrambling timing pulse from said first timing pulse and for performing descrambling according to said first and second timing pulses and a decoding information signal obtained by decoding said descrambling timing pulse.

DETAILED DESCRIPTION OF THE PREFERRED EMBODIMENTS

One embodiment of the present invention is described below with reference to the accompanying drawings.

Figure 1:
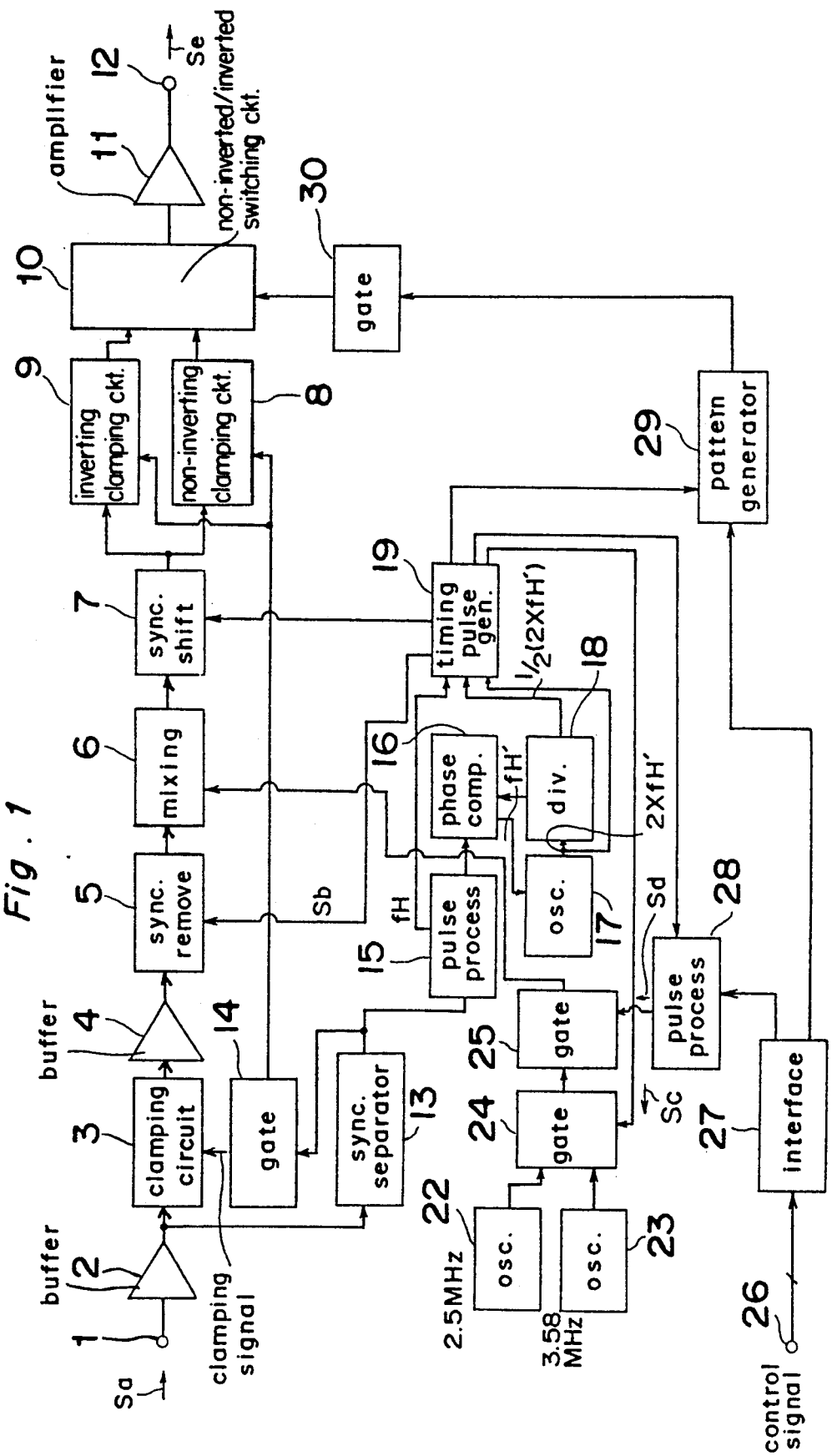
FIG. 1 is a block diagram of an embodiment of a picture scramble device according to the present invention.
Figure 3:
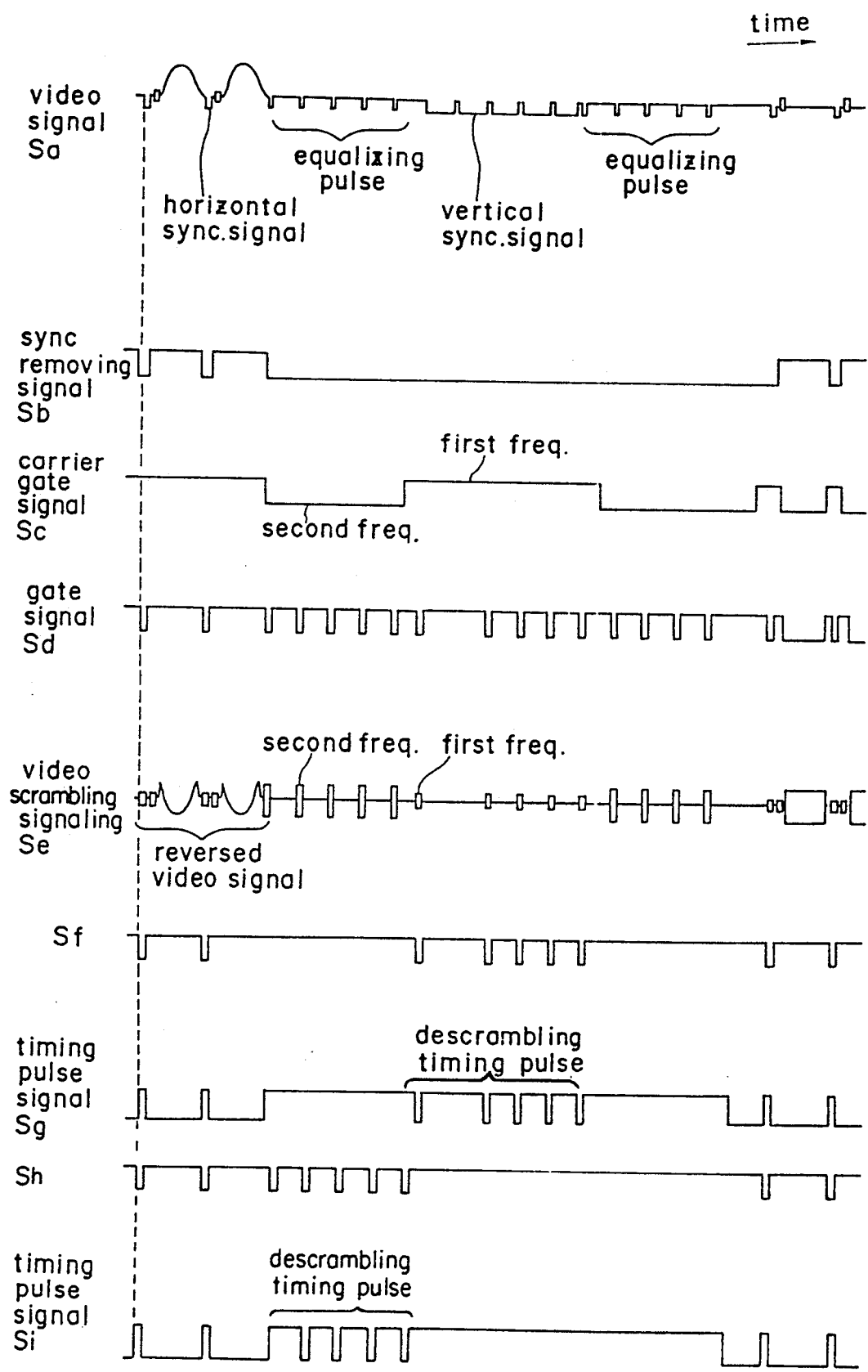
FIG. 3 is a waveform chart of the operation of the scramble device and descramble device shown in FIGS. 1 and 2, respectively.

In FIG. 1, a composite video signal Sa of a pay television system of an NTSC system inputted from a picture input terminal 1, as shown in FIG. 3, is supplied to a clamping circuit 3 through a buffer amplifier 2. In the clamping circuit 3, the video signal is clamped upon application of a clamping signal supplied from a gate circuit 14. The clamping signal is formed in the gate circuit 14 using a signal of the composite video signal Sa in which the various synchronizing signals are removed in a sync separator circuit 13. The clamped video signal is input to a sync removing circuit 5 through a buffer amplifier 4, and in the sync removing circuit 5, the horizontal synchronizing signal, vertical synchronizing signal, and equalizing pulse signal are removed from the composite video signal Sa upon application of the sync removing signal Sb shown in FIG. 3. The sync removing signal Sb is formed in such a way that a pulse signal having a horizontal synchronizing frequency of $f_H$ is generated in a pulse processing circuit 15 from a synchronizing signal fed from the sync separator circuit 13, the signal having a frequency of $f_H$ (referred to as the $F_H$ pulse signal) is phase-synchronized in a phase comparator circuit 16 with an $f_H'$ pulse obtained by dividing the frequency of the output pulse generated by an oscillator circuit 17 having an oscillation frequency of $2 \times f_H'$ to one half through a frequency divider circuit 18 to form an $f_H'$ pulse signal; thus, the sync removing signal Sb is formed based on these $f_H$ pulse signal and $f_H'$ pulse signal in a timing pulse circuit 19. The sync removed video signal from which the synchronizing signals are removed is attached by a first-frequency signal of 2.5 MHz and a second-frequency signal of 3.58 MHz in a space of the sync removed video signal during the sync removing period in a mixing circuit 6. The first-frequency signal is generated by a first oscillator circuit 22, while the second-frequency signal is generated by a second oscillator circuit 23, and first, in a gate circuit 24, the first-frequency signal and the second-frequency signal are switched by a carrier gate signal Sc generated in a timing pulse circuit 19, as shown in FIG. 3. More specifically, in the period of time when the carrier gate signal Sc is at a high level, i.e. during the intervals of the horizontal and vertical synchronizing period, the first-frequency signal is output, and during other periods, the second-frequency signal is output. One of the first-frequency signal and the second-frequency signal selected in the gate circuit 24 is output to the mixing circuit 6 through a gate circuit 25 upon application of a gate signal Sd shown in FIG. 3. The gate signal Sd is formed in a pulse processing circuit 28 using a pulse signal that is synchronized with the time position of the horizontal synchronizing signal formed in the timing pulse circuit 19 and a data signal that defines the period of time of the descrambling pulse generated from an interface circuit 27 in response to a control signal input to a control input terminal 26. The signal attached video signal fed from the mixing circuit 6 is shifted by 50IRE toward the video signal side during the time interval of the vertical synchronizing signal and equalizing pulse group within the line and field flyback period in the sync shifting circuit 7. The output of the shifting circuit is a so called shifted video signal. The shifted video signal whose line flyback period is shifted as mentioned above is supplied to a noninverting clamping circuit 8 and an inverting clamping circuit 9 respectively. In the circuit 8, the shifted video signal is clamped without inverting its polarity in response to the clamping signal fed from the gate circuit 14. On the other hand, the polarity of the shifted video signal is inverted and clamped in the inverting clamping circuit 9 in response to the clamping signal fed from the gate circuit 14. Both the non-inverted clamped video signal and the inverted clamped video signal are input to a non-inverted/inverted switching circuit 10. A scrambling mode signal input as a control signal through the control input terminal 26, is inputted through the interface circuit 27 to a non-inverting/inverting pattern generating circuit 29 to generate a non-inverting/inverting pattern signal in response to the control input; the pattern signal is to into the non-inverting/inverting switching circuit 10 through a gate circuit 30. In response to this non-inverting/inverted pattern signal, one of the non-inverting or inverted video signals is switchedly output from the non-inverting/inverting switching circuit 10 and amplified in an amplifier circuit 11, and output to a picture output terminal 12 as a picture scrambling signal Se shown in FIG. 3. The picture scrambling signal Se is modulated by a television modulator (not shown) and output as an RF (radio frequency) video signal.

Figure 2:
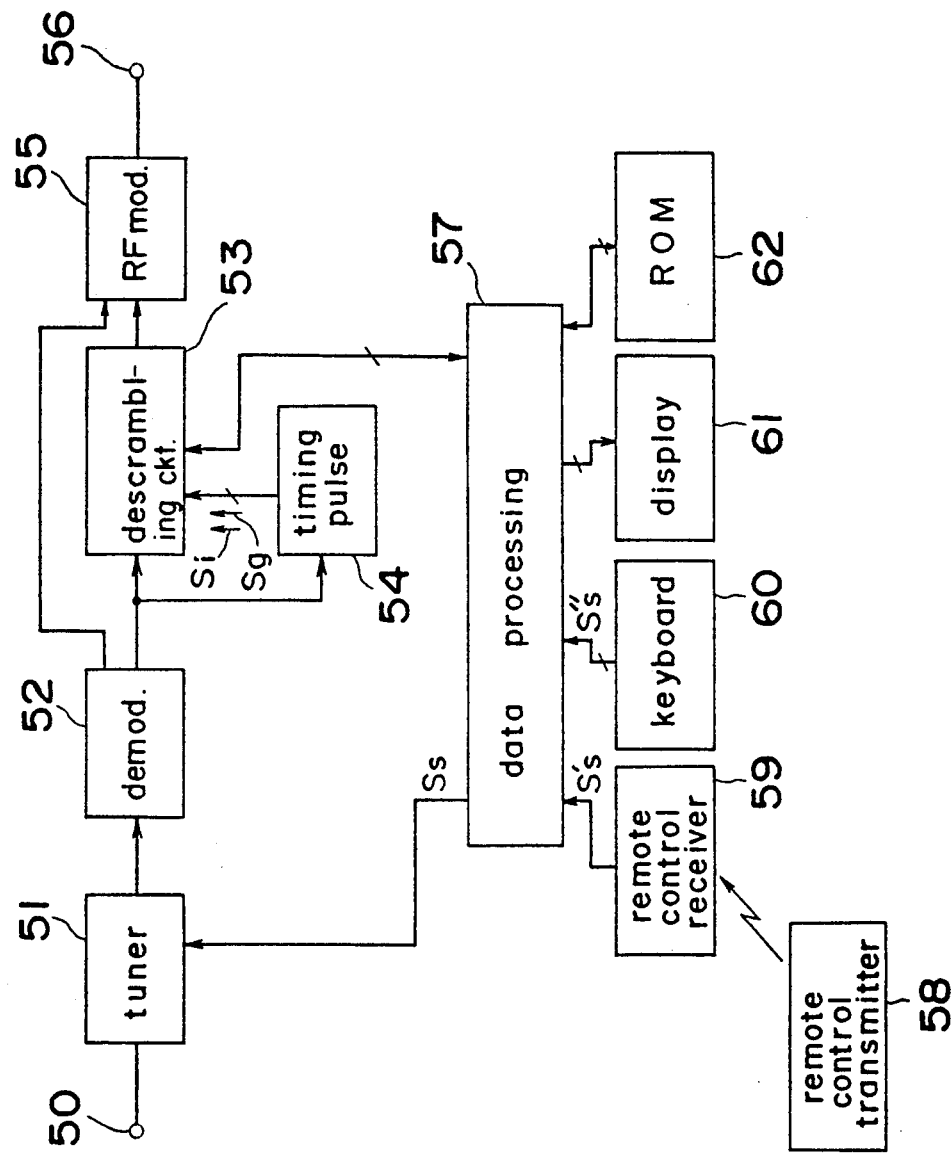
FIG. 2 is a block diagram of an embodiment of a picture descramble device according to the present invention.

FIG. 2 is a block diagram of a picture descrambling device of the present invention for releasing the picture scrambling signal Se.

A tuner 51 is adapted to receive various RF signals of a number of television channels and select one of the television channels selected by a user or viewer of the television system in accordance with the channel selection signal Ss provided by a data processing unit 57 which is operable by a keyboard 60 or a set of a remote control transmitter 58 and a remote control receiver 59.

The RF television signal of the selected channel is converted into an IF signal in the tuner, which is fed to a demodulator circuit 52 in which the IF signal is converted into a base-band video signal.

The demodulated video signal is inputted to a descrambling circuit 53 and a timing pulse circuit 54. The timing pulse circuit 54 detects the first-frequency signal Sf shown in FIG. 3 and renders it phase-synchronized with the signal of internally generated frequency $f_H'$ to form the signal of frequency $f_H$ synchronized with the demodulated video signal, thus generating a timing pulse signal Sg shown in FIG. 3 from the signal of frequency $f_H$. The timing pulse signal Sg is input to the descrambling circuit 53, which extracts a descrambling timing signal out of the timing pulse signal Sg, outputting it to the data processing unit 57. The data processing unit 57 decodes the descrambling timing signal to output a descrambling control signal to the descrambling circuit 53. The descrambling circuit 53 uses the timing pulse signal Sg and the descrambling control signal to perform shifting-restoration of the line and field flyback periods and polarity-restoration of the video signal, and further uses the timing signal Si derived from detection of the second-frequency signal Sh by the timing pulse circuit 54 to perform synchronous regeneration of the horizontal synchronizing signal, vertical synchronizing signal, and equalizing pulse signal for the picture scrambling processing. Although the descrambling operation of the video signal is roughly mentioned above, since the descrambling operation can be made by the reverse of the operation of the picture scrambling, a detailed description thereof is partially herein omitted. The video signal subjected to the descrambling processing is modulated as an RF television signal in an RF modulator 55 and output from an RF output terminal 56 so as to reproduce the video signal in a conventional television receiver (not shown) In FIG.

2, reference numeral 61 denotes a display unit, and 62 a memory (ROM) in which data for descrambling processing and other processing are stored.

As described above, since the picture scrambling signal Se according to the present invention is formed in such a manner that sync signals are removed and the part of the video signal in the line and field flyback periods is level-shifted, and moreover, both video signals with non-inverted polarity and with inverted polarity are present, there can be provided a picture scrambling signal having a highly reliable concealment property, thus it is possible to prevent illegal viewing and listening in pay television systems. Furthermore, the first-frequency and second-frequency signals are inserted into a video signal as the descrambling signals, so that it is not necessary to multiplex the descrambling signals and the audio signal in the television system, thereby preventing the audio signal from being deteriorated in sound quality.

Although in this embodiment the first-frequency and second-frequency signals are set on the basis of the setting of the NTSC method, frequencies may be changed for the PAL method or other methods. Also, although the generation of the first-frequency and second-frequency signals are rendered free, it may be synchronized with a gate signal to control oscillation.

We claim:

1. A pay television device which comprises:
    a picture scrambling device including: a sync removing means for removing sync signals of a composite video signal to produce sync removed video signals; a signal generating means for generating a first specific signal and a second specific signal; a first attaching means for attaching said first specific signal to a space of said sync removed video signal; a second attaching means for attaching said second specific signal to another space of said sync removed video signal thereby producing signal attached video signals; a shifting means for shifting a level of the signal attached video signals during time intervals of a vertical sync signal and an equalizing pulse group within line and field flyback periods of the composite video signal so as to thereby produce level shifted video signals; and an inverting means for changing the polarity of the level shifted video signals to thereby produce a scrambled picture signal; and
    a picture descrambling device including a timing pulse generating means for detecting said first specific signal and said second specific signal and for generating a first timing pulse signal and a second timing pulse signal; and a descrambling means for performing descrambling according to a decoding information signal derived from said first and second timing pulse signals, thereby producing the composite video signal.

2. A pay television device according to claim 1 wherein the frequency of the first specific signal and the second specific signal are respectively 2.5 MHz and 3.58 MHz.

3. A pay television device which comprises:
    a picture scrambling device including: a sync removing means for removing the horizontal sync signal, vertical sync signal, and equalizing pulse group of a composite video signal to produce sync removed video signals; a signal generating means for generating a first specific signal having a first frequency and a second specific signal having a second frequency; a first attaching means for attaching said first specific signal in a first period of a descrambling timing pulse period of the sync removed video signals within the space of the horizontal sync signal and vertical sync signal of said composite video signal; a second attaching means for attaching said second-frequency signal in a second period of the descrambling timing pulse period of the sync removed video signals within the space of the equalizing pulse group of said composite video signal to produce signal attached video signals; a shifting means for shifting a level of the signal attached video signals during time intervals of the vertical sync signal and equalizing pulse group within line and field flyback periods of the composite video signal so as to thereby produce level shifted video signals; and an inverting means for changing the polarity of the level shifted video signals in response to scrambling control data to produce a scrambled picture signal; and
    a picture descrambling device including: a timing pulse generating means for detecting said first-frequency signal from the scrambled picture signal output from said picture scrambling device to form a first timing pulse signal according to an internally generated frequency signal that is rendered phase-synchronized with the detected signal and for detecting said second-frequency signal out of said scrambled picture signal to form a second timing pulse signal; and a descrambling means for forming a descrambling timing pulse signal from said first timing pulse and for performing descrambling according to a said first and second timing pulse signals and a decoding information signal obtained by decoding said descrambling timing pulse.

4. A pay television device according to claim 3 wherein the frequency of the first specific signal and the second specific signal are respectively 2.5 MHz and 3.58 MHz.

* * * * *